United States Patent
Huang

(10) Patent No.: US 8,964,920 B2
(45) Date of Patent: Feb. 24, 2015

(54) AUTO-DETERMINING SAMPLING FREQUENCY METHOD AND DEVICE THEREOF

(71) Applicant: C-Media Electronics Inc., Taipei (TW)

(72) Inventor: Hung-Chi Huang, New Taipei (TW)

(73) Assignee: C-Media Electronics Inc., Taipei (TW)

( * ) Notice: Subject to any disclaimer, the term of this patent is extended or adjusted under 35 U.S.C. 154(b) by 0 days.

(21) Appl. No.: 14/068,038

(22) Filed: Oct. 31, 2013

(65) Prior Publication Data

US 2014/0341264 A1    Nov. 20, 2014

(30) Foreign Application Priority Data

May 20, 2013    (TW) .............................. 102117729 A

(51) Int. Cl.
*H04L 7/033*    (2006.01)
*H04L 27/227*    (2006.01)

(52) U.S. Cl.
CPC .................................. *H04L 27/2272* (2013.01)
USPC ......................................................... 375/355

(58) Field of Classification Search
CPC .......... H04L 7/044; H04L 7/0337; H04L 7/04
USPC ......................................................... 375/355
See application file for complete search history.

(56) References Cited

U.S. PATENT DOCUMENTS

| | | | | |
|---|---|---|---|---|
| 6,057,750 | A | * | 5/2000 | Sheng ............................ 335/234 |
| 7,715,509 | B2 | * | 5/2010 | Stojanovic et al. ............ 375/355 |
| 8,458,546 | B2 | * | 6/2013 | Mobin et al. ................... 714/744 |
| 2006/0045224 | A1 | * | 3/2006 | Cranford et al. ............... 375/355 |
| 2006/0076993 | A1 | * | 4/2006 | Teo et al. ........................ 327/165 |

* cited by examiner

*Primary Examiner* — Kevin Kim
(74) *Attorney, Agent, or Firm* — Li & Cai Intellectual Property (USA) Office

(57) ABSTRACT

The present disclosure provides an auto-determining sampling frequency method. The method is for determining sampling frequency for an input signal of a single wire transmission interface. Each frame of the input signal includes a preamble and binary data presented in a plurality of bits. The method includes utilizing an internal sampling clock to acquire a plurality of period widths of the preamble and the binary data in the input signal and determining range of the sampling frequency according to the detected period widths of the preamble and the binary data.

8 Claims, 4 Drawing Sheets

AUTO-DETERMINING SAMPLING FREQUENCY METHOD AND DEVICE THEREOF

BACKGROUND

1. Technical Field

The present disclosure relates to digital signal transmission, in particular, to a determining sampling frequency method and a device thereof for a single wire transmission interface.

2. Description of Related Art

The single wire transmission interface can be used to transmit digital signal. For example, Sony/Philips Digital Interface Format (S/PDIF) which is included in the IEC 60958 standard is a single wire transmission interface. The signals in such single wire transmission interface include data and clock message. Due to single wire design, it means that the data providing terminal (e.g., output terminal of the S/PDIF) also controls the clock frequency. In order to receive all messages correctly, in general, the receiving terminal (e.g. receiving terminal of the S/PDIF) will utilize the clock with higher frequency to acquire data or utilize the analog module with clock and data recovery circuit to recover the clock and the data so as to receive data correctly.

Referring to FIG. 1, FIG. 1 is a circuit block diagram illustrating a conventional clock and data recovery circuit. When the data of the input signal IN are acquired by analog means, the clock and data recovery circuit 10 can be utilized to recover the clock signal CLK" (recovered clock signal) and the data signal DATA" (recovered data signal). The digital circuit section only needs to acquire the recovered data signal according to the recovered clock signal so as to receive the data correctly. However, in order to acquire the data supporting wide range sampling frequency, it would be another challenge for the analog circuit. In order to lock the sampling frequency correctly, it may need more cost on algorithm design and operating time for the algorithm.

SUMMARY

An exemplary embodiment of the present disclosure provides an auto-determining sampling frequency method and a device thereof to speed up determining sampling frequency for an input signal of a single wire transmission interface.

An exemplary embodiment of the present disclosure provides an auto-determining sampling frequency method for determining sampling frequency for an input signal of a single wire transmission interface. Each frame of the input signal comprises a preamble and binary data presented in a plurality of bits. The method comprises the following steps of utilizing a sampling clock generated by a Phase-Locked Loop (PLL) in a clock and data recovery circuit to acquire period widths of a preamble and a plurality of bits in the input signal and determining the range of the sampling frequency for the input signal according to the detected period widths. To determine the range of the sampling frequency means to narrow the range of locking frequency for the clock and data recovery circuit so that the demanded time for locking frequency can be reduced.

An exemplary embodiment of the present disclosure provides a determining sampling frequency device for determining sampling frequency for an input signal of a single wire transmission interface. The determining sampling frequency device comprises a clock and data recovery circuit and a sampling clock determining circuit. The clock and data recovery circuit recovers a clock signal according to the input signal. A Phase-Locked Loop (PLL) in the clock and data recovery circuit generates a sampling clock. The clock and data recovery circuit samples the input signal according to the variation of the input signal, generates a recovered clock signal simultaneously and then acquire the corresponding input signal to generate a recovered data signal accordingly to the recovered clock signal. The sampling clock determining circuit utilizes the recovered clock signal as a sampling clock to acquire period widths of a preamble and a plurality of bits in the recovered data signal. Next, the sampling clock determining circuit determines whether a first predetermined period width exists in the plurality of the period widths; wherein the first predetermined period width corresponds to the preamble. Next, the sampling clock determining circuit determines whether a second predetermined period width or a third predetermined period width exists in the plurality of the period widths; wherein the second predetermined period width corresponds to binary data "1" and the third predetermined period width corresponds to binary data "0". Next, the sampling clock determining circuit determines whether to increase, decrease or maintain the frequency of the sampling clock according to a determining result for the plurality of the period widths.

To sum up, the auto-determining sampling frequency method and the device thereof provided in the exemplary embodiment of the present disclosure can speed up determining sampling frequency for an input signal of a single wire transmission interface without using a Micro Control Unit (MCU).

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the scope of the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Exemplary Embodiments of an Auto-Determining Sampling Frequency Method and a Device Thereof An exemplary embodiment of the present disclosure is to utilize digital logic means to detect frequency range for an input signal of a single wire transmission interface. An analog circuit can perform further detailed frequency-locking and phase-locking actions according to the detected frequency range so that the loading of the analog circuit can be reduced. In present exemplary embodiments, the input signal encoded by Biphase Mark Code is used as an example for illustration. The encoding methods used for an input signal of a single wire transmission interface are not intended to limit the scope of the present disclosure. The well-known Sony/Philips Digital Interface is an example of using the Biphase Mark Code to encode the data for transmission.

Figure 1:
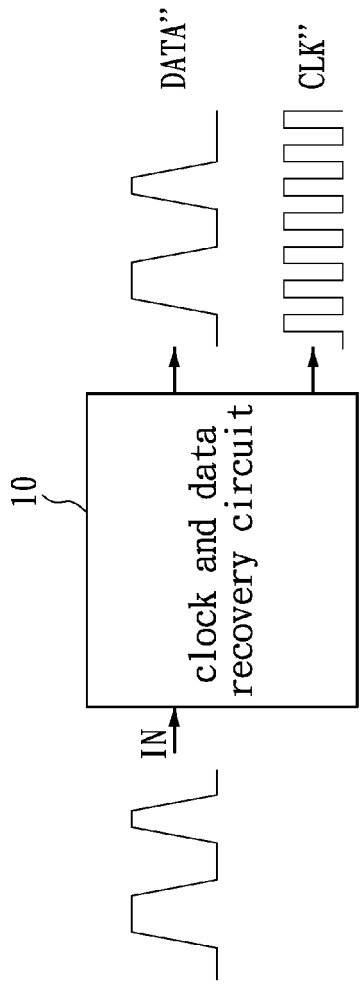
FIG. 1 is a circuit block diagram illustrating a conventional clock and data recovery circuit.
Figure 2:
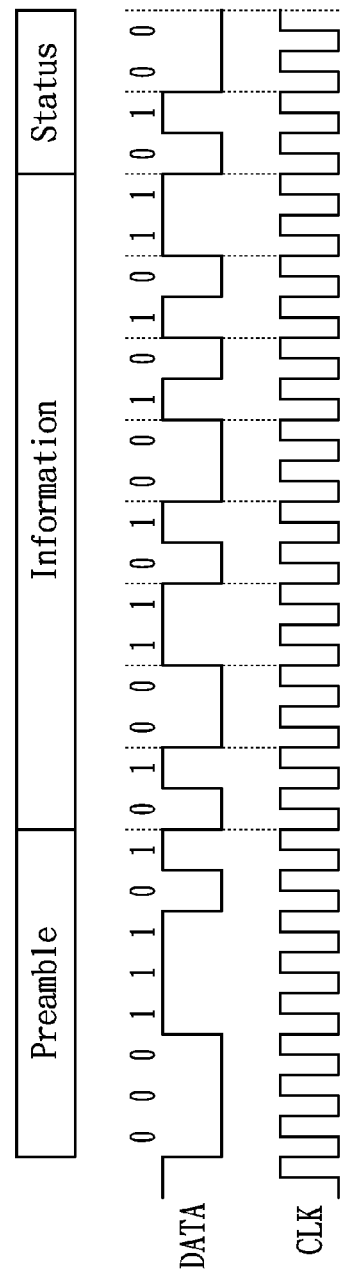
FIG. 2 is a schematic diagram illustrating an input signal encoded by Biphase Mark Code in an embodiment of the present disclosure.

Referring to FIG. 2, FIG. 2 is a schematic diagram illustrating an input signal encoded by Biphase Mark Code in an embodiment of the present disclosure. Each frame of the input signal IN comprises three portions of a preamble (or header), information and status. Taking Sony/Philips Digital Interface as an example, the encoded data frequency can be the range of 192/176.4 kHz, 96/88.2 kHz, 48/44.1 kHz, etc. The preamble has three period widths (comparing to the clock signal CLK); i.e., the preamble has three period widths of the clock signal CLK. By analyzing the detected period widths of the preamble, an appropriate frequency interval or the trend for changing sampling frequency (i.e., increasing frequency or decreasing frequency) can be effectively provided to an analog clock and data recovery circuit so as to reduce the demanded time for the clock and data recovery circuit to lock the frequency.

Moreover, by means of the Biphase Mark Code, the period width of the binary data "1" in the data signal DATA is one period width (comparing to the clock signal CLK) and the period width of the binary data "0" in the data signal DATA is two period widths (comparing to the clock signal CLK).

Regarding locking the appropriate frequency interval, please refer to table 1 as below. When utilizing a sampling clock CLK' initiated by an internal phase-locked loop to acquire the original input data (i.e., the input signal IN) and assuming that the sampling clock CLK' equals to the supported fastest signal frequency (192 kHz×128 times of sampling frequency=24.576 MHz), it is supposed that only 1/2/3 period(s) of data which corresponding to the binary data "1", the binary data "0" and the preamble respectively could be acquired in theory if the sampled signal is the fastest signal frequency, e.g., 192/176.4 kHz. If the signal frequency of the input signal is lower, 2/4/6 periods of data may be acquired. If the signal frequency of the input signal is further lower, 4/8/12 periods of data or even 6/12/18 periods of data may be acquired.

TABLE 1

| Frequency (kHz) | Binary data "1" | Binary data "0" | Preamble |
|---|---|---|---|
| 192/176.4 | 1 | 2 | 3 |
| 96/88.2 | 2 | 4 | 6 |
| 48/44.1 | 4 | 8 | 12 |
| 32 | 6 | 12 | 18 |

Regarding the trend for changing sampling frequency, when utilizing the recovered clock signal CLK" generated by the clock and data recovery circuit to detect the input signal, if three period widths are detected, the frequency of the recovered clock signal CLK" does not need to be changed. If more than four period widths are detected, it means that the generated recovered clock signal CLK" is too fast, then the frequency of the recovered clock signal CLK" should be decreased (or slow down). If none of any three period widths are detected, it means that the generated recovered clock signal CLK" is too slow, then the frequency of the recovered clock signal CLK" should be increased (or speed up). In view of the above analysis for the period width, determining sampling frequency method will be described hereinafter.

An Exemplary Embodiment of an Determining Sampling Frequency Method

Figure 3:
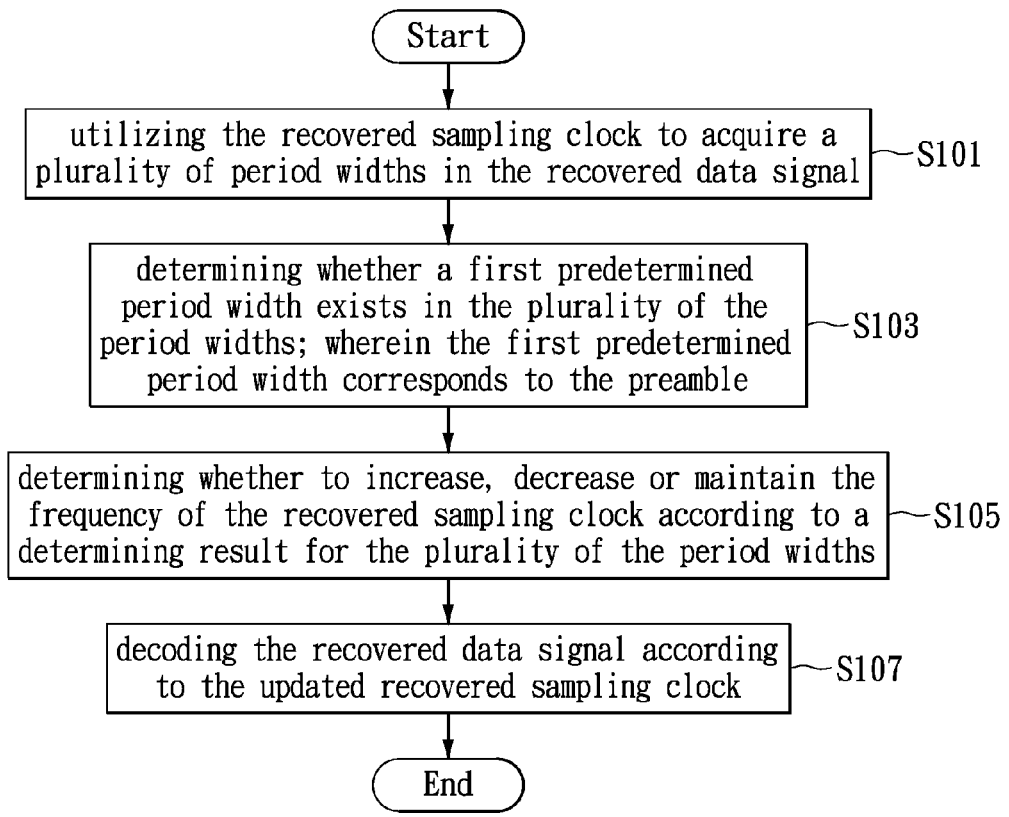
FIG. 3 is a flow chart of an auto-determining sampling frequency method in an embodiment of the present disclosure.

Referring to FIG. 3, FIG. 3 is a flow chart of an auto-determining sampling frequency method in an embodiment of the present disclosure. First, the step S101 is to utilize the recovered sampling clock (i.e., the recovered clock signal CLK") to acquire a plurality of period widths in the recovered data signal, e.g., to sample the data signal DATA encoded by Biphase Mark Code in FIG. 2 to acquire a plurality of period widths.

Next, the step S103 is to determine whether a first predetermined period width exists in the plurality of the period widths; wherein the first predetermined period width corresponds to the preamble. The first predetermined period width can be, for example, three period widths had by the preamble. If the clock is not locked yet (i.e., a correct clock is not acquired), for example, when four period widths are detected, it means the frequency of the recovered clock signal CLK" is too fast. If the time duration of a frame is detected in the detecting process and any of three period widths (period widths of the preamble) is still not detected, it means the frequency of the recovered clock signal CLK" is too slow.

Next, the step S105 is to determine whether to increase, decrease or maintain the frequency of the recovered sampling clock (i.e., the recovered clock signal CLK") according to a determining result for the plurality of the period widths.

Next, the step S107 is to decode the recovered data signal DATA according to the updated recovered sampling clock (i.e., the recovered clock signal CLK") so as to correctly acquire the data carried by the input signal IN.

Another Exemplary Embodiment of an Determining Sampling Frequency Method

Figure 4:
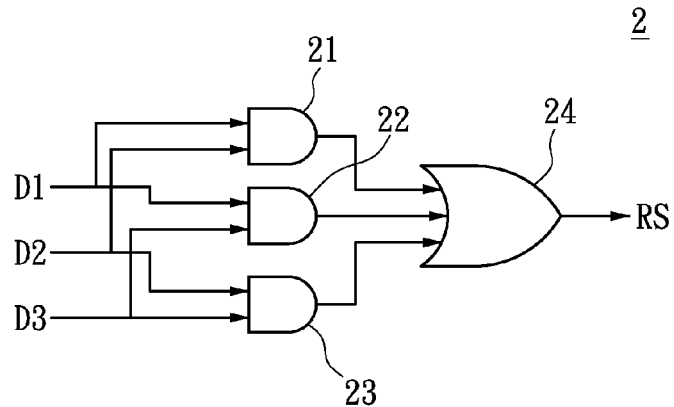
FIG. 4 is a circuit diagram illustrating a logic determination unit in an embodiment of the present disclosure.

Referring to TABLE 1 and FIG. 4 in the meanwhile, FIG. 4 is a circuit diagram illustrating a logic determination unit in an embodiment of the present disclosure. The logic determination unit 2 performs logic determination for the binary data "1" determination signal D1, the binary data "0" determination signal D2 and the preamble determination signal D3. The binary data "1" determination signal D1, the binary data "0" determination signal D2 and the preamble determination signal D3 represent whether a detected period width reaches a predetermined period width. For example, when determining whether 1/2/3 period width(s) exists in the input signal IN, if 1/2/3 period width(s) exists in the detected period width, the binary data "1" determination signal D1, the binary data "0" determination signal D2 and the preamble determination signal D3 are all represented in logic "1". If only two and three period widths are detected, the binary data "0" determination signal D2 and the preamble determination signal D3 are represented in logic "1". As illustrated in FIG. 4, the logic determination unit 2 comprises the AND logic 21, 22, 23 and the OR logic 24.

The AND logic 21 receives the binary data "1" determination signal D1 and the binary data "0" determination signal D2. The AND logic 22 receives the binary data "1" determination signal D1 and the preamble determination signal D3. The AND logic 23 receives the binary data "0" determination signal D2 and the preamble determination signal D3. The input ends of the OR logic 24 are connected to the output ends of the AND logic 21, 22 and 23. The OR logic 24 generates a determination result signal RS. In view of the logic structure in FIG. 4, when any two of the above mentioned determination signals (i.e., D1, D2 and D3) are logic "1", the determination result signal RS is logic "1"; i.e., the current determination frequency is the correct frequency (e.g., 32 kHz) or the correct frequency range (e.g., 96/88.2 kHz). The above determination method may further utilize the acquired period widths to determine whether the sampling clock CLK' is correct.

Figure 5:
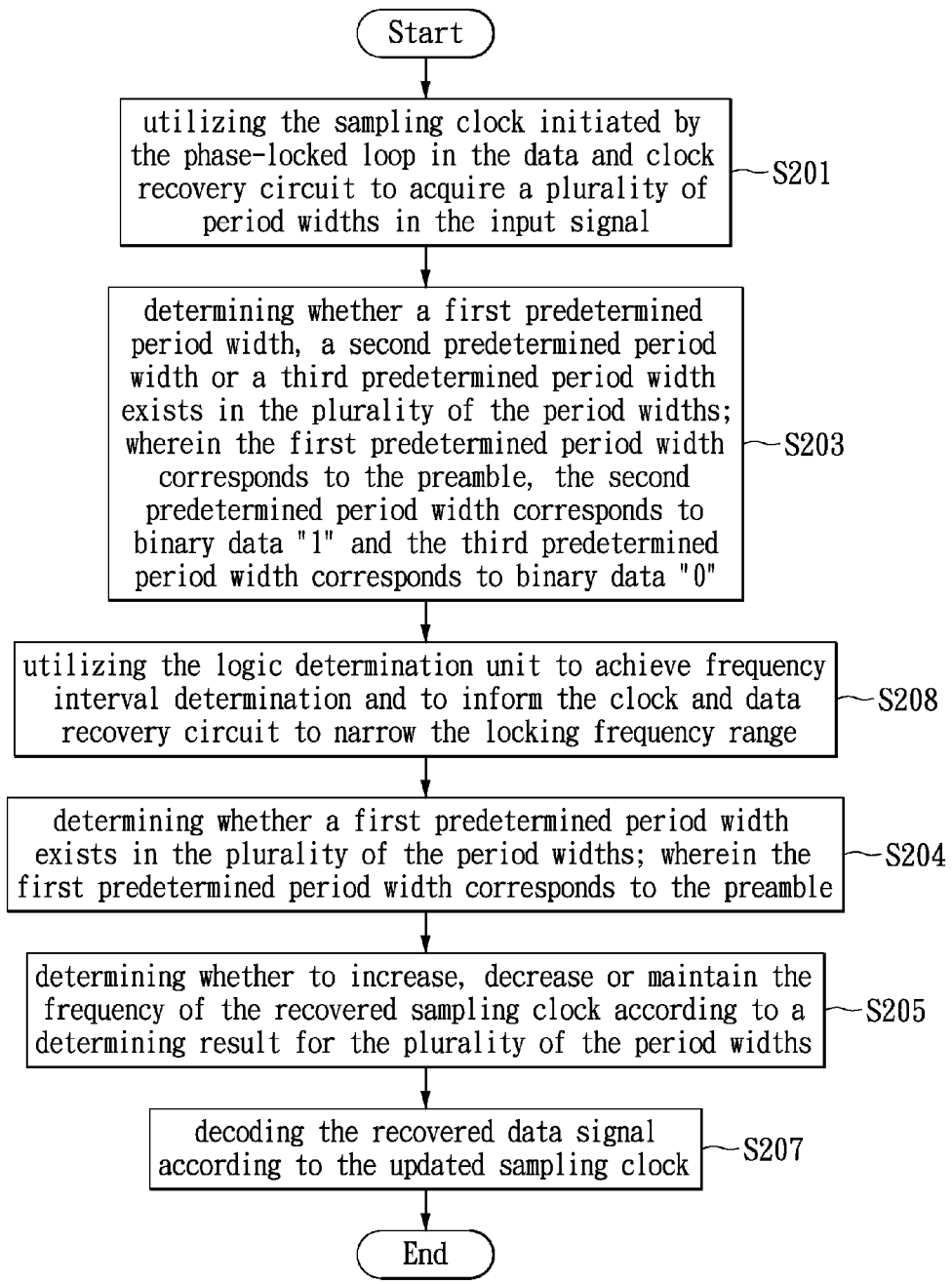
FIG. 5 is a flow chart of an auto-determining sampling frequency method in another embodiment of the present disclosure.

Referring to FIG. 5, FIG. 5 is a flow chart of an auto-determining sampling frequency method in another embodiment of the present disclosure. First, the step S201 is to utilize the sampling clock CLK' initiated by the phase-locked loop in the data and clock recovery circuit to acquire a plurality of period widths in the input signal IN.

Next, the step S203 is to determine whether a first predetermined period width, a second predetermined period width or a third predetermined period width exists in the plurality of the period widths; wherein the first predetermined period width corresponds to the preamble, the second predetermined period width corresponds to binary data "1" and the third predetermined period width corresponds to binary data "0". The first predetermined period width, the second predetermined period width and the third predetermined period width can be the one period width, the two period widths and the three period widths at 192/176.4 kHz in TABLE 1 respectively.

The step S208 is to utilize the logic determination unit in FIG. 4 to achieve frequency interval determination and (utilize the frequency range control signal FR) to inform the clock and data recovery circuit to narrow the locking frequency range so as to speed up the convergence time for the clock and data recovery circuit (the detailed descriptions will be illustrated in the following embodiment and FIG. 6).

Next, the step S204 is to determine whether a first predetermined period width exists in the plurality of the period widths; wherein the first predetermined period width corresponds to the preamble. Next, the step S205 is to determine whether to increase, decrease or maintain the frequency of the recovered sampling clock (the recovered clock signal CLK") according to a determining result for the plurality of the period widths. In the process of determining whether a first predetermined period width exists in the plurality of the period widths, when four period widths are detected, it means that the frequency of the recovered clock signal CLK" is too fast. If the time duration of a frame is detected in the detecting process and any of three period widths (period widths of the preamble) is still not detected during the detecting process, it means the frequency of the recovered clock signal CLK" is too slow. Next, the step S207 is to decode the recovered data signal DATA according to the updated sampling clock CLK'.

The above step S204 is the same as the step S103 in FIG. 3. The step S205 is the same as the step S105 in FIG. 3. The step S207 is the same as the step S107 in FIG. 3. The step S201 is similar with the step S101. The only difference is that the sampling clock in the step S101 is the recovered clock signal CLK" generated by the clock and data recovery circuit and the sampled data is the recovered data signal DATA"; the sampling clock in the step S201 is the sampling clock CLK' initiated by the phase-locked loop in the data and clock recovery circuit and the sampled data is the original input signal IN.

An Exemplary Embodiment of an Determining Sampling Frequency Device

Figure 6:
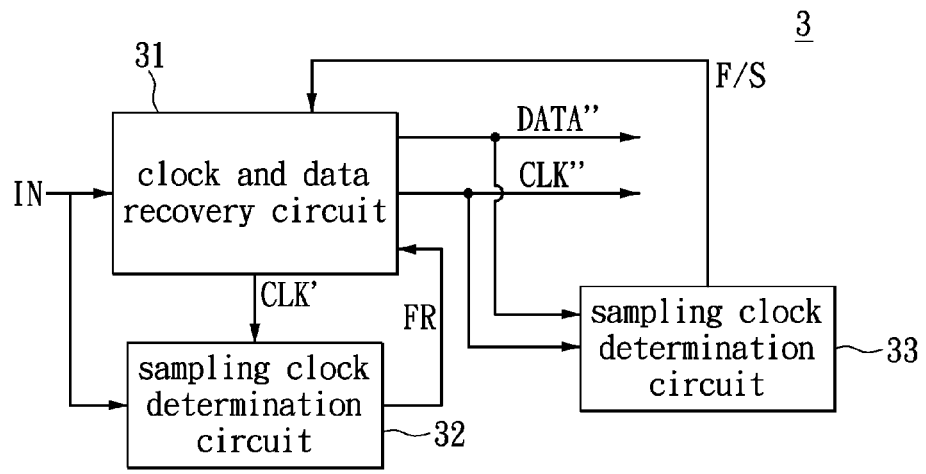
FIG. 6 is a circuit block diagram illustrating a determining sampling frequency device in another embodiment of the present disclosure.

Referring to FIG. 5 and FIG. 6 in the meanwhile, FIG. 6 is a circuit block diagram illustrating a determining sampling frequency device in another embodiment of the present disclosure. The determining sampling frequency device 3 is configured to determine the sampling frequency for the input signal IN of a single wire transmission interface. Each frame of the input signal IN comprises a preamble and binary data presented in a plurality of bits. The determining sampling frequency device 3 comprises a clock and data recovery circuit 31 and sampling clock determination circuits 32 and 33.

The clock and data recovery circuit 31 samples the variation of the input signal IN and generates a recovered clock signal CLK" simultaneously. The clock and data recovery circuit 31 recover the clock signal CLK" and data signal DATA" from the input signal IN according to the recovered clock signal CLK". The sampling clock determination circuit 32 utilizes a sampling clock CLK' generated by an internal phase-locked loop to acquire the period width of the preamble in the input signal IN so as to determine the sampling frequency range for the input signal IN. The sampling clock determination circuit 32 generates the frequency range control signal FR according to a determination result and transmits the frequency range control signal FR to the clock and data recovery circuit 31. The clock and data recovery circuit 31 tunes the recovered clock signal CLK" according to the frequency range control signal FR to make the recovered clock signal CLK" be in an appropriate frequency range so as to recover the correct data signal DATA".

The clock and data recovery circuit 31 acquires the corresponding input signal IN to generated the recovered data signal DATA" and the recovered clock signal CLK" according to the recovered clock signal CLK" tuned by the sampling clock determination circuit 32. The sampling clock determination circuit 33 utilizes clock signal CLK" as a sampling frequency to acquire a plurality of period widths in the data signal DATA" and determines whether a first predetermined period width exists in the plurality of the period widths; wherein the first predetermined period width corresponds to the preamble. The sampling clock determination circuit 33 outputs the clock control signal F/S to the clock and data recovery circuit 31. The sampling clock determination circuit 33 determines whether (to utilize the clock control signal F/S) to control the clock and data recovery circuit 31 to increase, decrease or maintain the frequency of the clock signal CLK" recovered by the clock and data recovery circuit 31 according to a determining result for the plurality of the period widths.

The sampling clock determination circuit 32 may further determines whether a second predetermined period width or a third predetermined period width exists in the plurality of the period widths; wherein the second predetermined period width corresponds to binary data "1" and the third predetermined period width corresponds to binary data "0". When at least two of the first predetermined period width, the second predetermined period width and the third predetermined period width exist in the period widths, the sampling clock determination circuit 32 maintains the frequency of the sampling clock CLK".

When at least one period width greater than the first predetermined period width exists in the period widths, the sampling clock determination circuit 33 decreases the frequency of the sampling clock CLK". When any of period width equaling to the first predetermined period width does not exist in the period widths, the sampling clock determination circuit 33 increases the frequency of the sampling clock CLK".

Another Exemplary Embodiment of an Determining Sampling Frequency Device

Figure 7:
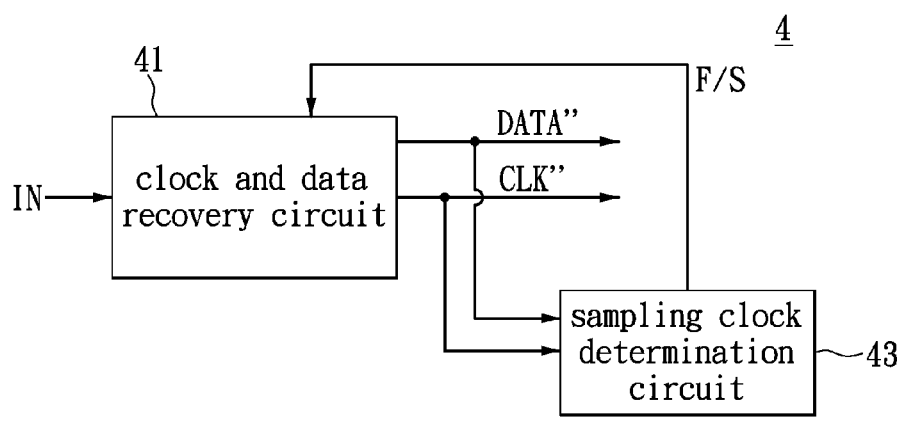
FIG. 7 is a circuit block diagram illustrating a determining sampling frequency device in another embodiment of the present disclosure.

Referring to FIG. 3 and FIG. 7 in the meanwhile, FIG. 7 is a circuit block diagram illustrating a determining sampling frequency device in another embodiment of the present disclosure. The determining sampling frequency device 4 is configured to determine the sampling frequency for the input signal IN of a single wire transmission interface. Each frame of the input signal IN comprises a preamble and binary data presented in a plurality of bits. The determining sampling frequency device 4 comprises a sampling clock determination circuit 43 and a clock and data recovery circuit 41. In contrast to the determining sampling frequency device 3 as illustrated in FIG. 3, the determining sampling frequency device 4 does not comprise the sampling clock determination circuit 32. The sampling clock determination circuit 43 is the same as the sampling clock determination circuit 33 in FIG. 6.

The sampling clock determination circuit 43 is configured to utilize sampling clock CLK" to acquire a plurality of period widths in the recovered data DATA" and determines whether a first predetermined period width exists in the plurality of the period widths; wherein the first predetermined period width corresponds to the preamble. The sampling clock determination circuit 43 determines whether to increase, decrease or maintain frequency of the sampling clock CLK" according to a determining result for the plurality of the period widths. The clock and data recovery circuit 41 receives the clock control signal F/S generated by the sampling clock determination circuit, recovers the clock signal CLK" according to the clock control signal F/S and recovers the data signal DATA" in the corresponding input signal IN according to the clock signal CLK". The clock control signal F/S is used to indicate the clock and data recovery circuit 41 to increase, decrease or maintain the frequency of the clock signal CLK".

According to the exemplary embodiments in the present disclosure, the auto-determining sampling frequency method and the device thereof can speed up determining sampling frequency for an input signal of a single wire transmission interface by means of simple logic determination without using a Micro Control Unit (MCU). In addition, a sampling clock determination circuit implemented by means of simple logic determination can reduce the operating load of a clock and data recovery circuit for locking a correct clock frequency for an input signal.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An auto-determining sampling frequency method for determining sampling frequency for an input signal of a single wire transmission interface, each frame of the input signal comprising a preamble and binary data presented in a plurality of bits, the method comprising:
   utilizing a recovered clock signal to acquire a plurality of period widths of a recovered data signal, wherein the recovered data signal is acquired by utilizing the recovered clock signal as a sampling clock to sample the input signal;
   determining whether a first predetermined period width exists in the period widths, wherein the first predetermined period width corresponds to the preamble;
   determining whether a second predetermined period width or a third predetermined period width exists in the period widths, wherein the second predetermined period width corresponds to binary data "1" and the third predetermined period width corresponds to binary data "0"; and
   determining whether to increase, decrease or maintain frequency of the sampling clock according to a determining result for the period widths.

2. The auto-determining sampling frequency method as claimed in claim 1, wherein the input signal is encoded by Biphase Mark Code.

3. The auto-determining sampling frequency method as claimed in claim 1, wherein the single wire transmission interface is Sony/Philips Digital Interface Format (S/PDIF).

4. The auto-determining sampling frequency method as claimed in claim 1, wherein the step of determining whether to increase, decrease or maintain frequency of the sampling clock according to a determining result for the period widths further comprises:
   maintaining the frequency of the sampling clock when at least two of the first predetermined period width, the second predetermined period width and the third predetermined period width exist in the period widths;
   decreasing the frequency of the sampling clock when at least one period width greater than the first predetermined period width exists in the period widths; and
   increasing the frequency of the sampling clock when any of period width equaling to the first predetermined period width does not exist in the period widths.

5. A determining sampling frequency device for determining sampling frequency for an input signal of a single wire transmission interface, the determining sampling frequency device comprising:
   a clock and data recovery circuit, generating a sampling clock according to a Phase-Locked Loop (PLL) in the clock and data recovery circuit, sampling the input signal generating a recovered clock signal, and acquiring the input signal according to the recovered clock signal to generate a recovered data signal; and
   a sampling clock determining circuit, utilizing the recovered clock signal as a sampling clock to acquire period widths of a preamble and a plurality of bits in the recovered data signal, determining whether a first predetermined period width exists in the period widths; wherein the first predetermined period width corresponds to the preamble, determining whether a second predetermined period width or a third predetermined period width exists in the period widths; wherein the second predetermined period width corresponds to binary data "1" and the third predetermined period width corresponds to binary data "0";
   wherein the sampling clock determining circuit determines whether to control the clock and data recovery circuit to increase, decrease or maintain frequency of the clock signal recovered by the clock and data recovery circuit according to a determining result for the period widths.

6. The determining sampling frequency device as claimed in claim 5, wherein when at least two of the first predetermined period width, the second predetermined period width and the third predetermined period width exist in the period widths, the sampling clock determining circuit maintains the frequency of the sampling clock; when at least one period width greater than the first predetermined period width exist in the period widths, the sampling clock determining circuit decreases the frequency of the sampling clock; when any of period width equaling to the first predetermined period width does not exist in the period widths, the sampling clock determining circuit increases the frequency of the sampling clock.

7. The determining sampling frequency device as claimed in claim 5, wherein the input signal is encoded by Biphase Mark Code.

8. The determining sampling frequency device as claimed in claim 5, wherein the single wire transmission interface is Sony/Philips Digital Interface Format (S/PDIF).

* * * * *